United States Patent
Tawata

(10) Patent No.: US 11,845,270 B2
(45) Date of Patent: Dec. 19, 2023

(54) INK-JET TYPE VEHICLE COATING MACHINE AND VEHICLE COATING METHOD

(71) Applicant: ABB Schweiz AG, Baden (CH)

(72) Inventor: Takahiro Tawata, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/631,696

(22) PCT Filed: Apr. 7, 2020

(86) PCT No.: PCT/JP2020/015663
§ 371 (c)(1),
(2) Date: Jan. 31, 2022

(87) PCT Pub. No.: WO2021/205537
PCT Pub. Date: Oct. 14, 2021

(65) Prior Publication Data
US 2022/0274398 A1 Sep. 1, 2022

(51) Int. Cl.
*B41J 2/045* (2006.01)
*B05C 5/00* (2006.01)
(Continued)

(52) U.S. Cl.
CPC ............ *B41J 2/04526* (2013.01); *B05C 5/00* (2013.01); *B25J 11/0075* (2013.01); *B41J 2/04586* (2013.01); *B41J 3/4073* (2013.01)

(58) Field of Classification Search
CPC .. B41J 2/04526; B41J 2/04586; B41J 3/4073; B41J 25/316; B41J 29/38; B05C 5/00; B25J 11/0075; B25J 13/086
See application file for complete search history.

(56) References Cited

U.S. PATENT DOCUMENTS 10,940,691 B2 * 3/2021 Daniels ................ B41J 25/308
2005/0285896 A1 12/2005 Hori
(Continued)

FOREIGN PATENT DOCUMENTS

| CN | 104203584 A | 12/2014 |
|----|-------------|---------|
| JP | 2014050832 A | 3/2014 |

(Continued)

OTHER PUBLICATIONS

International Search Report, issued by the ISA/JP Japan Patent Office, regarding corresponding patent application Serial No. PCT/JP2020/015663; dated Jun. 23, 2020; 7 pages (with Translation).
(Continued)

*Primary Examiner* — Thinh H Nguyen
(74) *Attorney, Agent, or Firm* — GREENBERG TRAURIG, LLP

(57) ABSTRACT

Provided are an ink-jet type vehicle coating machine and an ink-jet type vehicle coating method that enable formation of a uniform coating film thickness at a coating portion including an end of a vehicle. In a state where a longitudinal direction of a nozzle head 53 is orthogonal to a scanning direction, a first nozzle array 55A and a second nozzle array 55B are disposed such that droplets discharged from nozzles 54 of the second nozzle array 55B are discharged to intermediate portions between droplets discharged from nozzles 54 adjacent to each other in the first nozzle array 55A. In addition, on the basis of trajectory data for moving the nozzle head 53, attitude data for keeping the longitudinal direction of the nozzle head 53 perpendicular to a main scanning direction of the nozzle head 53 is formed. An arm control unit 110 controls a robot arm on the basis of the trajectory data and attitude data such that, in a state where the nozzle head 53 performs coating while moving in the main scanning direction, the longitudinal direction of the (Continued)

nozzle head 53 is kept perpendicular to the main scanning direction.

12 Claims, 13 Drawing Sheets

(51) Int. Cl.
  *B25J 11/00* (2006.01)
  *B41J 3/407* (2006.01)

(56) References Cited

U.S. PATENT DOCUMENTS

| | | |
|---|---|---|
| 2009/0167817 A1 | 7/2009 | Orr |
| 2011/0262622 A1 | 10/2011 | Herre et al. |
| 2014/0063096 A1 | 3/2014 | Pitz et al. |
| 2017/0157947 A1 | 6/2017 | Morikawa |
| 2018/0169688 A1 | 6/2018 | Medard et al. |
| 2018/0336443 A1 | 11/2018 | Kaiba et al. |

FOREIGN PATENT DOCUMENTS

| | | |
|---|---|---|
| JP | 2014111307 A | 6/2014 |
| JP | 2016175077 A | 10/2016 |
| JP | 2018502698 A | 2/2018 |
| JP | 2018502702 A | 2/2018 |
| JP | 2018094552 A | 6/2018 |
| JP | 2018122225 A | 8/2018 |
| JP | 2018192405 A | 12/2018 |
| WO | 2016/097932 A1 | 6/2016 |
| WO | 2018108570 A1 | 6/2018 |
| WO | 2018108572 A1 | 6/2018 |

OTHER PUBLICATIONS

China First Office Action, issued by the National Intellectual Property Administration, regarding corresponding patent application Serial No. CN 202080055691.9; dated Jul. 21, 2022; 28 pages (including English Translation).

China Second Office Action, issued by the National Intellectual Property Administration, regarding corresponding patent application Serial No. CN 202080055691.9; dated Sep. 20, 2022; 20 pages (including English Translation).

Huang Huining; "Application of Digital Inkjet Printing Technology and Equipment in the Area of Ceramic Tiles", Digital Inkjet Printing Technology and Equipment Application for Ceramic Wall and Floor Tiles; Chapter 8; Beijing, China; May 2018; pp. 217-219.

\* cited by examiner

INK-JET TYPE VEHICLE COATING MACHINE AND VEHICLE COATING METHOD

CROSS-REFERENCE TO RELATED APPLICATIONS

This is a national stage application which claims priority to International patent application Serial No.: PCT/JP2020/015663, filed on Apr. 7, 2020; and which is herein incorporated by reference in its entirety.

FIELD

The present invention relates to an inkjet-type vehicle painting machine and an inkjet-type vehicle painting method.

BACKGROUND

Robot painting using robots predominates in painting lines for vehicles such as automobiles. In the robot painting, a painting machine (a rotary atomization type painting machine) having a rotary atomization type painting head mounted at a front end of an articulated robot is used, but it is proposed to paint the vehicles by using an inkjet-type vehicle painting machine. Such an inkjet-type painting machine has, for example, structures shown in Patent Literature 1 to 3.

Patent Literature 1 discloses that a painting width is automatically adjusted by adjusting the angle of a rotation direction of a painting head in accordance with the shape of a painting location of a vehicle, which serves as a painting object. In addition, the same content is also disclosed in Patent Literature 2 and Patent Literature 3.

Patent Literature 1: Japanese Patent No. 2018-502702
Patent Literature 2: WO2018/108570
Patent Literature 3: WO2018/108572

However, in the structures disclosed in Patent Literature 1 to 3, the painting width is adjusted by rotating the painting head. In general, however, in the painting head, under the premise of an advancement direction being perpendicular to a long side direction of the painting head corresponding to the painting width, a plurality of nozzles constitute a nozzle column, and a large number of the nozzle columns are provided. Therefore, when the painting head is rotated to perform painting, there may be cases where paint droplets ejected from predetermined nozzles of a certain nozzle column overlap with the paint droplets ejected from predetermined nozzles of other nozzle columns at a specific location, but no such overlap occurs elsewhere. In particular, the presence or absence of such overlap of the paint droplets becomes remarkable when the nozzle column is inclined relative to the advancement direction of the painting head. Therefore, it is preferable to perform painting in a state where the long side direction of the painting head is kept perpendicular to the advancement direction of the painting head.

However, for example, represented by the roof of the vehicle, the width of the painting location of the vehicle is not constant, and the height is not constant either. Therefore, when the painting is performed in the state where the long side direction of the painting head is kept perpendicular relative to the advancement direction of the painting head, it is relatively difficult to form a uniform painting film thickness relative to the painting location represented by the roof of the vehicle.

SUMMARY

The present invention is made in view of the above situations and is intended to provide an inkjet-type vehicle painting machine and an inkjet-type vehicle painting method, which may form a uniform painting film thickness relative to a painting location represented by the roof of a vehicle, when painting is performed in a state where a long side direction of a nozzle head corresponding to a painting width is kept perpendicular relative to an advancement direction of a painting head.

In order to solve the above problems, according to a first aspect of the present invention, an inkjet-type vehicle painting machine is provided, which is used for performing painting by ejecting paint from nozzles onto a vehicle located on a painting line. The inkjet-type vehicle painting machine is characterized by including: a nozzle head having a plurality of nozzles; a robot arm capable of assembling the nozzle head to a front end portion and moving the assembled nozzle head; an arm control portion for controlling the operation of the robot arm; a head control portion for controlling the driving of the nozzle head; and painting data forming means for forming, based on a painting range corresponding to a vehicle to be painted, painting data that is used for controlling the driving of the nozzle head by means of the head control portion, wherein a plurality of nozzle columns composed of the nozzles are arranged obliquely relative to a long side direction of the nozzle head, the nozzle column is provided with a first nozzle column that is located on one side in a scanning direction of the nozzle head, and a second nozzle column that is located on the other side in the scanning direction, the first nozzle column and the second nozzle column are configured in a state where the droplets ejected from the nozzles in the second nozzle column are ejected in the middle of the droplets ejected from adjacent nozzles in the first nozzle column when the long side direction of the nozzle head is orthogonal to the scanning direction, the painting data forming means create trajectory data for driving the robot arm to move the nozzle head, and forms, based on the trajectory data, posture data for keeping the long side direction of the nozzle head perpendicular relative to a main scanning direction of the nozzle head.

In addition, in the above invention, preferably, the painting data forming means take a location on a vehicle side where the distance between the vehicle and a nozzle ejection surface in the painting width of the nozzle head is the closest as a reference location, and create the trajectory data at a position higher than the reference location by a predetermined height.

In addition, in the above invention, preferably, the painting data forming means form, before forming the trajectory data, a painting three-dimensional model for the painting range per painting range of the vehicle to be painted, and forms divided painting data actually corresponding to the painting width of the nozzle head based on the painting three-dimensional model, the trajectory data and the posture data, and the divided painting data includes an overlapping portion that overlaps with adjacent divided painting data.

In addition, in the above invention, preferably, the painting data forming means form the posture data, so that in a width direction of the vehicle, the nozzle head is inclined at an inclination angle the same as the inclination angle of the painting location of the vehicle, which is located at a location opposed to the center of the nozzle head in the long side direction.

In addition, in the above invention, preferably, the painting data forming means form the posture data, so that in the long side direction of the vehicle, the nozzle head is inclined at an inclination angle the same as the inclination angle of the painting location of the vehicle, which is located at a location opposed to the center of the nozzle head in a short side direction.

In addition, in the above invention, preferably, the painting data forming means increase the concentration of the divided painting data according to the inclination angle of the location opposed to the center of the nozzle head in the short side direction.

In addition, in the above invention, preferably, the painting data forming means form, before forming the trajectory data, a painting three-dimensional model for the painting range per painting range of the vehicle to be painted, forms two-dimensional painting data for painting the vehicle based on the painting three-dimensional model, forms divided painting data actually corresponding to the painting width of the nozzle head based on the two-dimensional painting data, and forms the trajectory data based on the divided painting data.

In order to solve the above problems, according to a second aspect of the present invention, an inkjet-type vehicle painting method is provided, including a nozzle head having a plurality of nozzle columns composed of nozzles, wherein the nozzle column is arranged obliquely relative to a long side direction of the nozzle head, the nozzle column is provided with a first nozzle column that is located on one side in a scanning direction of the nozzle head, and a second nozzle column that is located on the other side in the scanning direction, the first nozzle column and the second nozzle column are configured in a state where the droplets ejected from the nozzles in the second nozzle column are ejected in the middle of the droplets ejected from adjacent nozzles in the first nozzle column when the long side direction of the nozzle head is orthogonal to the scanning direction, moreover, trajectory data is formed, the trajectory data is used for driving a robot arm, which assembles the nozzle head at a front end portion, to move the nozzle head, and based on the trajectory data, posture data is formed for keeping the long side direction of the nozzle head perpendicular relative to a main scanning direction of the nozzle head.

According to the present invention, the inkjet-type vehicle painting machine and the inkjet-type vehicle painting method are provided, which may form the uniform painting film thickness relative to the painting location represented by the roof of the vehicle, when painting is performed in the state where the long side direction of the nozzle head corresponding to the painting width is kept perpendicular relative to the advancement direction of the painting head.

DETAILED DESCRIPTION OF EMBODIMENTS

Hereinafter, the inkjet-type vehicle painting machine and the inkjet-type vehicle painting method involved in various embodiments of the present invention will be illustrated based on the drawings.

The inkjet-type vehicle painting machine and the inkjet-type vehicle painting method in the present embodiment are a method for "painting" a painting target object relative to a vehicle or a vehicle component (hereinafter, the vehicle component becoming a portion of the vehicle is also regarded as the "vehicle" for description) located on a painting line in an automobile manufacturing plant, so as to form a painting film on the surface of the painting target object to provide protection and beauty to the surface thereof. Therefore, it is necessary to perform painting with desired painting quality within a certain period of time relative to a vehicle moving along the painting line every predetermined time.

In addition, in order to paint the vehicle, it is necessary to perform painting faster on a vehicle to be painted at the same action as a vehicle that has already been painted. Therefore, a multi-axis robot arm, which will be described later, needs to perform the same action relative to many vehicles, and a nozzle head unit 50 needs to move while maintaining a state of being opposed to the vehicle at a short distance. In addition, the nozzle head unit 50 is installed on a front end side of the robot arm, but a loadable weight cannot be greatly increased if a moment when the robot arm is extended is considered. In addition, as described above, since the vehicles move along the painting line one after another, it is necessary for the vehicle painting machine to perform the painting as quickly as possible. That is, the vehicle painting machine in the present embodiment is used under the particularity of such vehicle painting.

In addition, with regard to the inkjet-type vehicle painting machine and the inkjet-type vehicle painting method in the present embodiment, not only the above painting film may be formed, but also various appearance designs and images may be formed relative to the painting target object such as a vehicle and a vehicle component.

(1-1. With Regard to an Overall Structure of the Inkjet-Type Vehicle Painting Machine)

Figure 1:
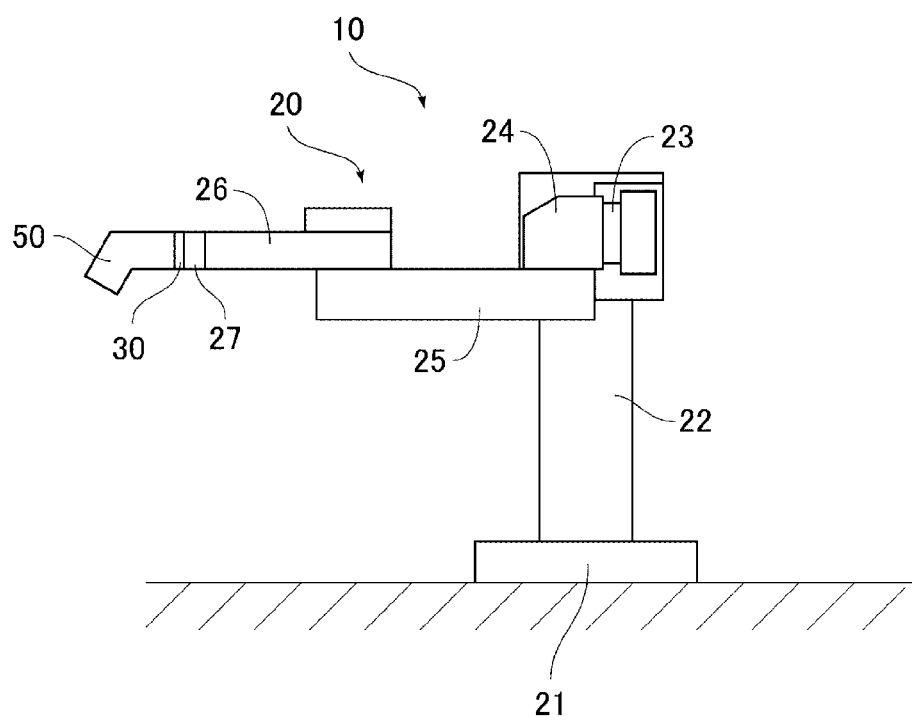
FIG. 1 is a schematic diagram showing an overall structure of an inkjet-type vehicle painting machine involved in an embodiment of the present invention.
Figure 2:
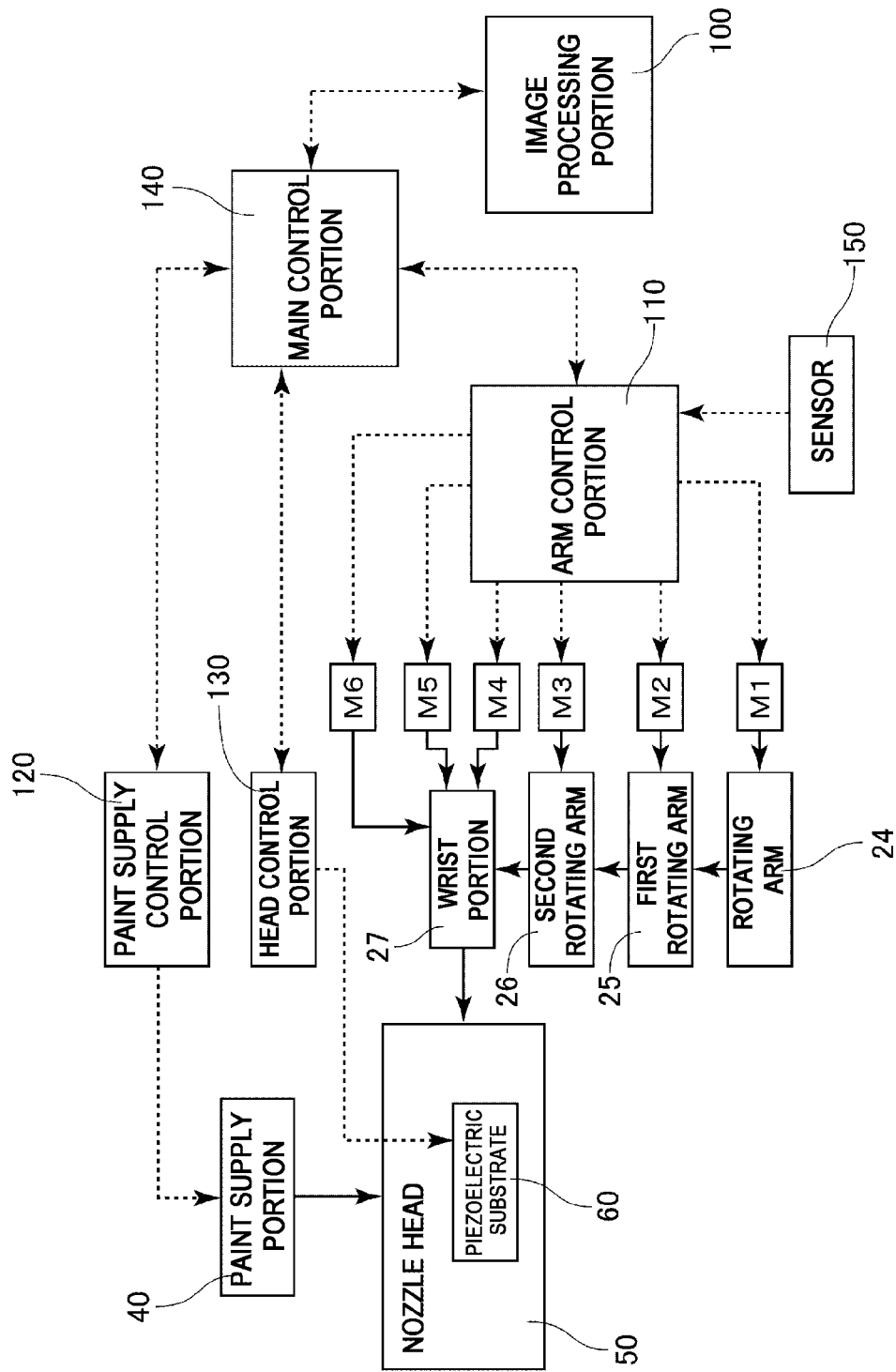
FIG. 2 is a diagram showing a schematic structure of the vehicle painting machine shown in FIG. 1.

FIG. 1 is a schematic diagram showing an overall structure of an inkjet-type vehicle painting machine 10 involved in a first embodiment of the present invention. FIG. 2 is a diagram showing a schematic structure of the vehicle painting machine 10. As shown in FIG. 1 and FIG. 2, the vehicle painting machine 10 is provided with a painting robot 20, a paint supply portion 40, and a nozzle head unit 50.

(1-2. With Regard to a Main Body of a Painting Device)

As shown in FIG. 1, the painting robot 20 takes a base 21, a leg portion 22, a rotating shaft portion 23, a rotating arm 24, a first rotating arm 25, a second rotating arm 26, a wrist portion 27, and motors M1 to M6 for driving them as main components. In addition, a portion from the rotating shaft portion 23 to the wrist portion 27 corresponds to a robot arm, but other portions excluding, for example, the leg portion 22, may also correspond to the robot arm.

Among these, the base 21 is a portion arranged at an arrangement location such as the ground, but the base 21 may also be able to travel relative to the arrangement location. In addition, the leg portion 22 is a portion erected from the base 21 toward an upper portion. In addition, a joint portion may also be arranged between the leg portion 22 and the base 21, so that the leg portion 22 may rotate relative to the base 21.

In addition, the rotating shaft portion 23 is arranged at an upper end of the leg portion 22. The rotating arm 24 is installed on the rotating shaft portion 23 in a freely rotatable state. In addition, the rotating arm 24 is driven by the motor M1 to rotate, but as such a motor, an electric motor or a pneumatic motor may be used. In addition, when the vehicle painting machine 10 is arranged in an explosion-proof area and an electric motor is used, it is preferable to have an explosion-proof structure for increasing an internal pressure in a shell of the rotating shaft portion 23 (the situation is the same in the following motors M2 to M6). However, when the vehicle painting machine 10 is arranged in a place other than the explosion-proof area, the above-mentioned explosion-proof structure may not be provided. In addition, at least one of the rotating arm 24, the first rotating arm 25, the second rotating arm 26, the wrist portion 27 and a chuck portion 30 may have such an explosion-proof structure.

In addition, one end side of the first rotating arm 25 is installed on the rotating arm 24 in a rotatable state. In addition, the motor M2 that drives the first rotating arm 25 to rotate relative to the rotating shaft portion 23 may be accommodated in the shell of the rotating arm 24, and may also be accommodated in the shell of the first rotating arm 25.

In addition, one end side of the second rotating arm 26 is installed on the other end side of the first rotating arm 25 via a shaft portion in a freely swingable state. The motor M3 that drives the second rotating arm 26 to rotate relative to the first rotating arm 25 may be accommodated in the shell of the first rotating arm 25, and may also be accommodated in the shell of the second rotating arm 26.

The wrist portion 27 is installed on the the other end side of the second rotating arm 26. The wrist portion 27 may perform a rotational movement around a plurality of (for example, three) shaft portions with different orientations as the center. Thereby, the orientation of the nozzle head unit 50 may be controlled with high precision. In addition, several shaft portions may be provided as long as the number is two or more.

The motors M4 to M6 are provided in order to enable such a wrist portion 27 to perform the rotational movement with the each shaft portion as the center. In addition, the motors M4 to M6 are accommodated in the shell of the second rotating arm 26, but they may also be accommodated in other locations.

In addition, the nozzle head unit 50 is installed on the arm portion 27 by means of a bracket portion that is not shown in the figure. That is, the nozzle head unit 50 is detachably arranged on the arm portion 27 by means of the bracket portion.

In addition, the vehicle painting machine 10 equipped with the rotating shaft portion 23, the rotating arm 24, the first rotating arm 25, the second rotating arm 26, the wrist portion 27, and the motors M1 to M6 for driving them is a robot that may be driven by 6 axes. However, the vehicle painting machine 10 may be a robot that is driven by any number of axes greater than 4.

(1-3. With Regard to the Nozzle Head Unit)

Figure 3:
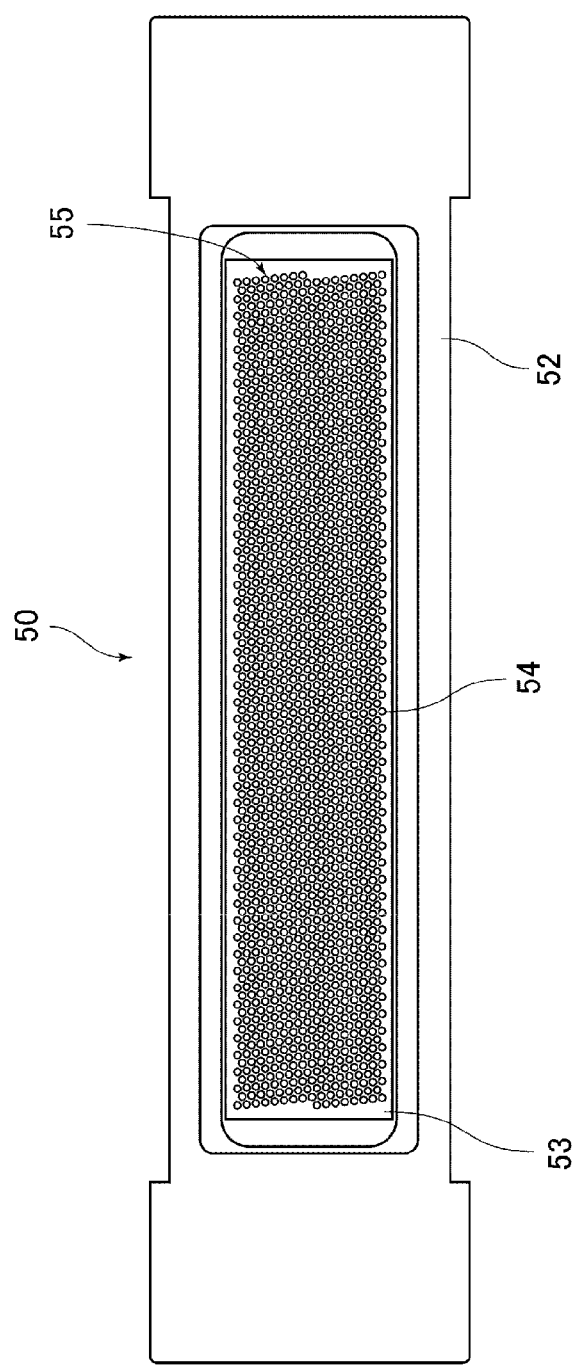
FIG. 3 is a diagram showing a front view state of a nozzle ejection surface for ejecting paint from a nozzle head unit of the vehicle painting machine shown in FIG. 1.
Figure 4:
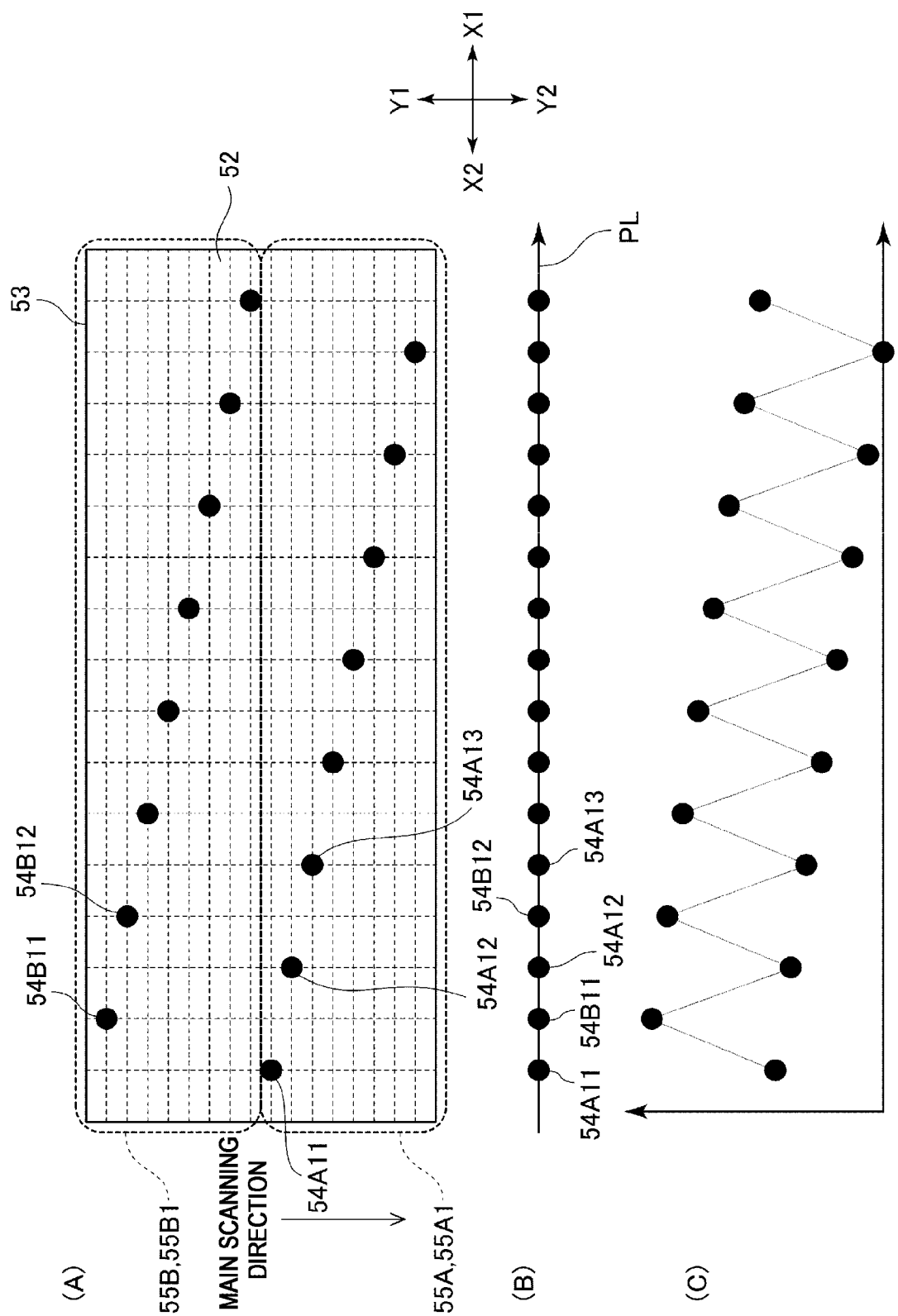
FIG. 4(A) is a partial top view showing the configuration of each nozzle on the nozzle ejection surface in the nozzle head unit of the vehicle painting machine shown in FIG. 1.
FIG. 4(B) shows a result of ejecting paint from each nozzle.
FIG. 4(C) shows a driving moment of each nozzle.
Figure 5:
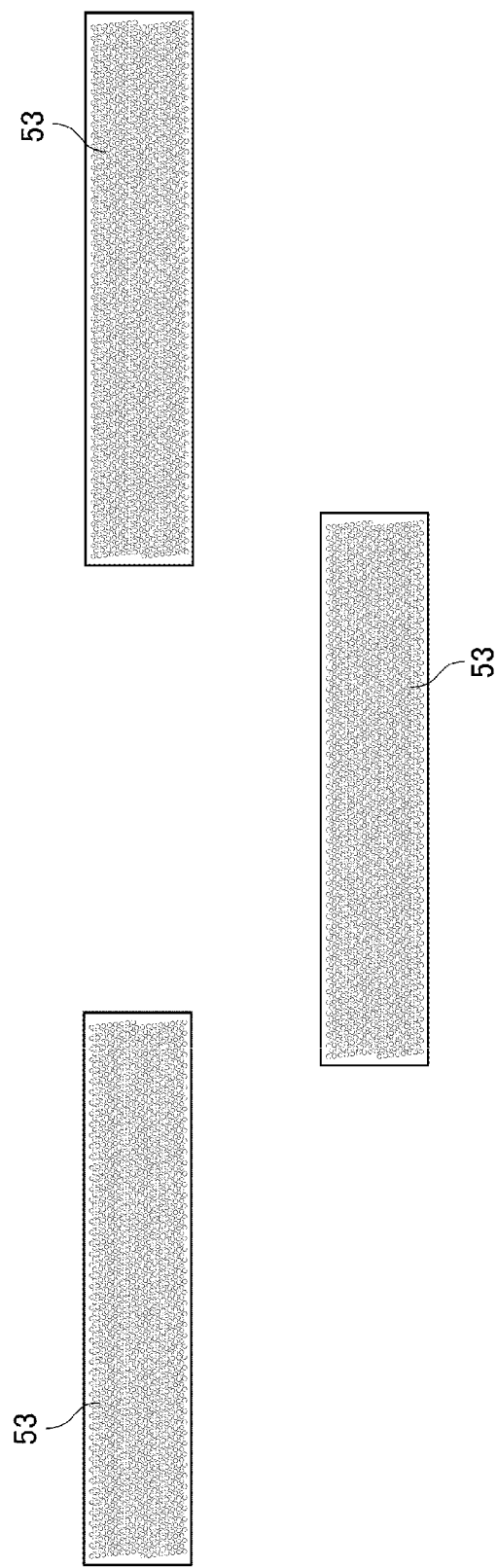
FIG. 5 is a diagram showing a state wherein a plurality of nozzle heads are arranged in a staggered manner in the inkjet-type vehicle painting machine shown in FIG. 1.

Next, the nozzle head unit 50 will be described. The nozzle head unit 50 is installed on the wrist portion 27 by means of the chuck portion 30. As shown in FIGS. 3-5, the nozzle head unit 50 is provided with a head cover which is not shown in figure, and various structures are built in the head cover. In addition, examples of the structures built in the head cover include a paint circulation path, that is, a head side circulation path (not shown in the figure), a head control portion 130, etc.

FIG. 3 is a diagram showing a front view state of a nozzle ejection surface 52 for ejecting paint from the nozzle head unit 50. In FIG. 4, FIG. 4(A) is a partial top view showing the configuration of each nozzle 54 on the nozzle ejection surface 52, FIG. 4(B) shows a result of ejecting paint from each nozzle 54, and FIG. 4(C) shows a driving moment of each nozzle 54. In addition, in FIG. 4(A), for convenience of description, a secondary scanning direction (an X direction) is shown in a state where it is greatly stretched. For example, on the leftmost side of a nozzle head 53 in FIG. 3, there are a nozzle column 55 composed of a total of 8 nozzles 54 on a depth side of a paper surface of FIG. 3 and a nozzle column 55 composed of a total of 8 nozzles 54 on a front side of the paper surface of FIG. 3, but a state corresponds to FIG. 4(A), where the two nozzle columns 55 are taken out, a main operation direction (the X direction) remains unchanged without being stretched, and the secondary scanning direction (the X direction) is greatly stretched.

As shown in FIGS. 3 and 4(A), the nozzle ejection surface 52 is provided with a plurality of nozzle columns 55 in which the nozzles 54 are arranged in a column in a direction that is inclined relative to a long side direction of the nozzle head unit 50. In addition, in FIG. 4(C), a longitudinal axis represents time (driving moment), and a horizontal axis represents positions of a total of 8 nozzles 54A and a total of 8 nozzles 54B in the X direction. In addition, in the above description, a long side of the nozzle head unit 50 refers to a longer direction (a lateral width direction) of the nozzle head in FIG. 3.

In the present embodiment, such a nozzle column 55 is provided with a first nozzle column 55A located on one side (a Y2 side) of the main scanning direction (a Y direction) and a second nozzle column 55B located on the other side (a Y1 side) of the main scanning direction. In the first nozzle column 55A and the second nozzle column 55B, the nozzle column located on the side (the left side) closest to the secondary scanning direction of FIG. 3 is respectively shown in FIG. 4 as a first nozzle column 55A1 and a second nozzle column 55B1.

Here, if the nozzles 54A, 54B in the first nozzle column 55A1 and the second nozzle column 55B1 are projected on a straight line (a projection straight line PL) along the secondary scanning direction of FIG. 4(B), the first nozzle 54B11 counted starting from the Y1 side of the second nozzle column 55B1 is located on the projection straight line PL between the first nozzle 54A11 and the second nozzle 54A12 counted starting from the Y1 side of the first nozzle column 55A1. In addition, the second nozzle 54B12 counted starting from the Y1 side of the second nozzle column 55B1 is located between the second nozzle 54A12 and the third nozzle 54A13 counted starting from the Y1 side. Hereinafter, similarly, between adjacent nozzles 54A in the first nozzle column 55A, the nozzles 54B in the second nozzle column 55B are located on the above projection straight line PL.

Therefore, in a state where the nozzle head unit 50 is scanning, by controlling the ejection moment of the droplets ejected from the respective nozzles 54A and 54B as shown in FIG. 4(C), the droplets may land on the straight line in the secondary scanning direction as shown in FIG. 4(B). As it were, the nozzle columns 55 are configured such that the landing positions of the droplets of adjacent nozzle columns 55 are staggered by a half pitch. Thereby, it is possible to increase the point density while painting.

However, as shown in FIG. 3, a single nozzle head 53 exists on the nozzle ejection surface 52. However, a head group composed of a plurality of nozzle heads 53 may also exist on the nozzle ejection surface 52. In this case, as an example, as shown in FIG. 5, a structure in which a plurality of nozzle heads 53 are aligned and are configured in a staggered manner may be cited, but the configuration of the nozzle heads 53 of the head group may be not staggered.

Figure 6:
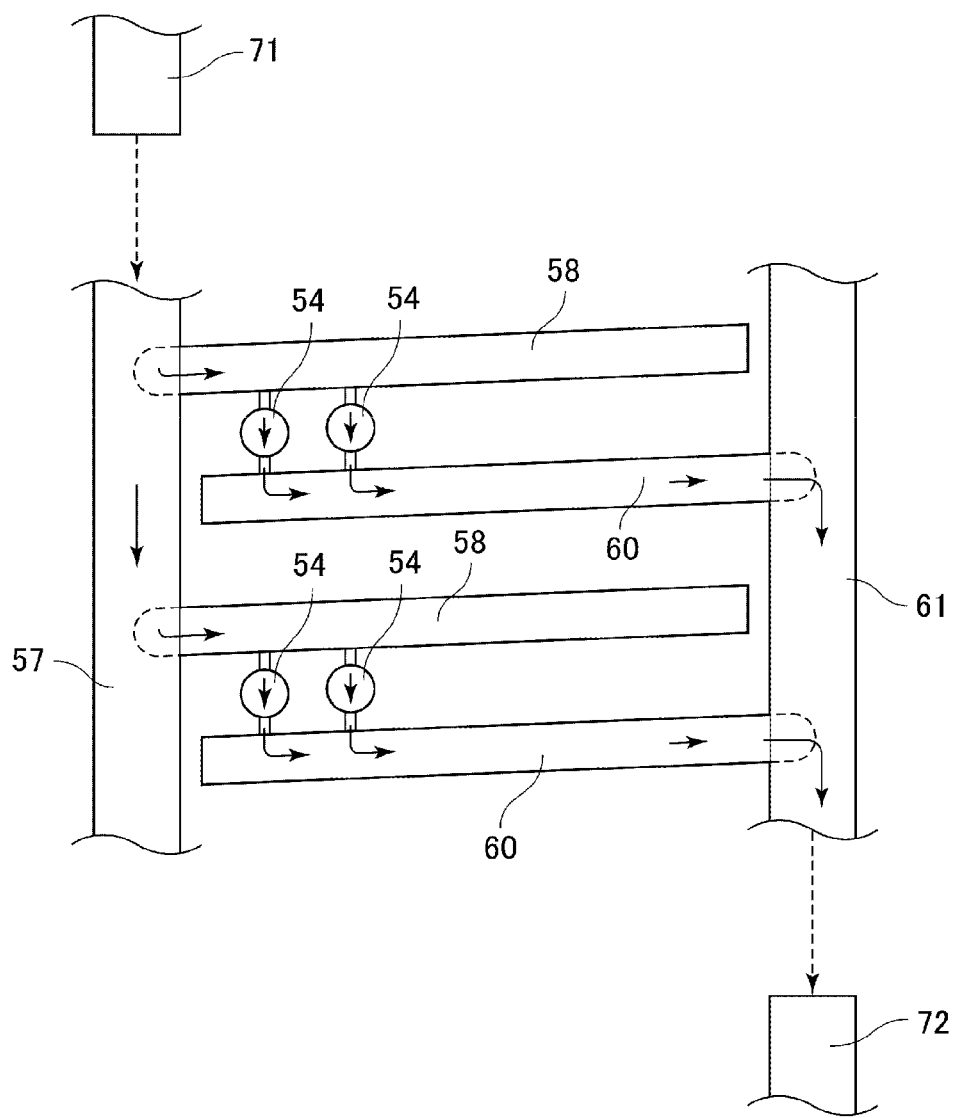
FIG. 6 is a diagram showing a schematic structure of supplying paint to each nozzle in the inkjet-type vehicle painting machine shown in FIG. 1.
Figure 7:
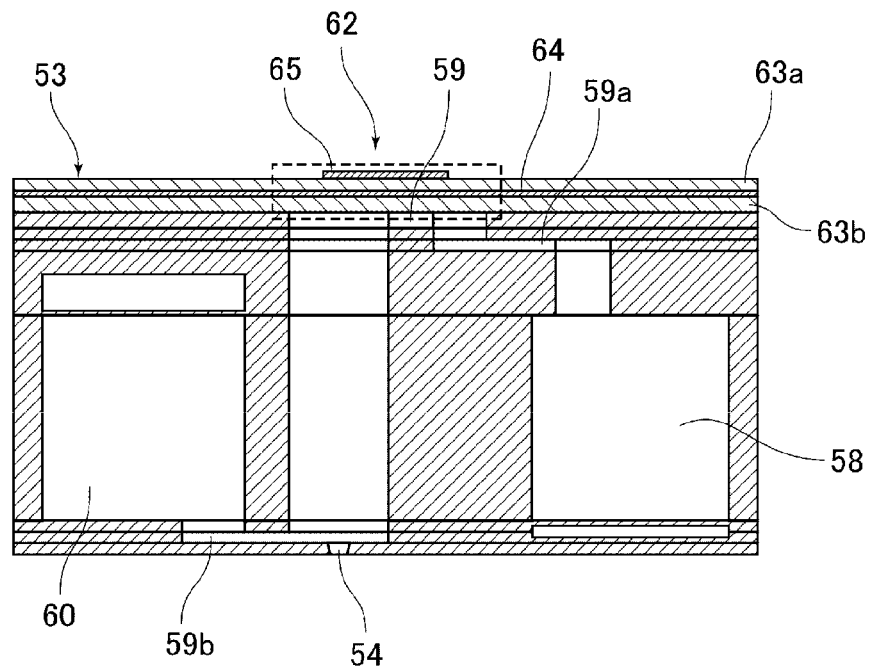
FIG. 7 is a cross-sectional view showing a deformation example of a structure in the vicinity of a column direction supply flow path, a nozzle pressurizing chamber and a column direction discharge flow path shown in FIG. 6.

FIG. 6 is a diagram showing an overall structure for supplying paint to each nozzle 54. FIG. 7 is a cross-sectional view showing a structure in the vicinity of a column direction supply flow path 58, a nozzle pressurizing chamber 59 and a column direction discharge flow path 60. As shown in FIGS. 6 and 7, the nozzle head 53 is provided with a supply side large flow path 57, the column direction supply flow path 58, the nozzle pressurizing chamber 59, the column direction discharge flow path 60, and a discharge side large flow path 61. The supply side large flow path 57 is a flow path for supplying paint from a supply path 71 of a head side circulation path described later. In addition, the column direction supply flow path 58 is a flow path in which the paint in the supply side large flow path 57 diverges.

In addition, the nozzle pressurizing chamber 59 is connected to the column direction supply flow path 58 by means of a nozzle supply flow path 59a. As a result, the paint is supplied to the nozzle pressurizing chamber 59 from the column direction supply flow path 58. The nozzle pressurizing chamber 59 is provided corresponding to the number of nozzles 54 and may eject the paint inside from the nozzle 54 by using a driving element described later.

In addition, the nozzle pressurizing chamber 59 is connected to the column direction discharge flow path 60 by means of a nozzle ejection flow path 59b. Therefore, the paint that is not ejected from the nozzle 54 is discharged from the nozzle pressurizing chamber 59 via the nozzle ejection flow path 59b toward the column direction discharge flow path 60. In addition, the column direction discharge flow path 60 is connected to the discharge side large flow path 61. The discharge side large flow path 61 is a flow path in which the paint ejected from various column direction discharge flow paths 60 merges. The discharge side large flow path 61 is connected to a return path 72 of the head side circulation path.

According to such a structure, the paint supplied from the supply path 71 of the head side circulation path is ejected from the nozzle 54 by means of the supply side large flow path 57, the column direction supply flow path 58, the nozzle supply flow path 59a and the nozzle pressurizing chamber 59. In addition, the paint that is not ejected from the nozzle 54 returns from the nozzle pressurizing chamber 59 to the return path 72 of the head side circulation path by means of the nozzle ejection flow path 59b, the column direction discharge flow path 60 and the discharge side large flow path 61.

In addition, in the structure shown in FIG. 6, one column direction supply flow path 58 is configured to correspond to one column direction discharge flow path 60. However, it may also be configured such that one column direction supply flow path 58 corresponds to a plurality of (for example, two) column direction discharge flow paths 60. In addition, it may also be configured such that a plurality of column direction supply flow paths 58 correspond to one column direction discharge flow path 60.

In addition, as shown in FIG. 7, a piezoelectric substrate 62 is configured on a top surface (the surface on an opposed side of the nozzle 54) of the nozzle pressurizing chamber 59. The piezoelectric substrate 62 is provided with two piezoelectric ceramic layers 63a and 63b, which serve as piezoelectric bodies, and is also provided with a common electrode 64 and individual electrodes 65. The piezoelectric ceramic layers 63a and 63b are members that may expand and contract by applying a voltage from the outside. As such piezoelectric ceramic layers 63a and 63b, ceramic materials with high dielectricity such as lead zirconate titanate (PZT) series, NaNbO3 series, BaTiO3 series, (BiNa)NbO3 series, and BiNaNb5O15 series may be used.

In addition, as shown in FIG. 7, the common electrode 64 is configured between the piezoelectric ceramic layer 63a and the piezoelectric ceramic layer 63b. In addition, a surface electrode (not shown in the figure) for the common electrode is formed on an upper surface of the piezoelectric substrate 62. The common electrode 64 and the surface electrode for the common electrode are electrically connected by a through conductor which is not shown in figure and exists on the piezoelectric ceramic layer 63a. In addition, the individual electrodes 65 are respectively configured at locations opposed to the nozzle pressurizing chamber 59.

Further, a portion of the piezoelectric ceramic layer 63a sandwiched between the common electrode 64 and the individual electrode 65 is polarized in a thickness direction. Therefore, if a voltage is applied to the individual electrode 65, the piezoelectric ceramic layer 63a is deformed due to a piezoelectric effect. Therefore, when a predetermined driving signal is applied to the individual electrode 65, the piezoelectric ceramic layer 63b relatively fluctuates in such a way that the volume of the nozzle pressurizing chamber 59 is reduced, thereby ejecting the paint.

Figure 8:
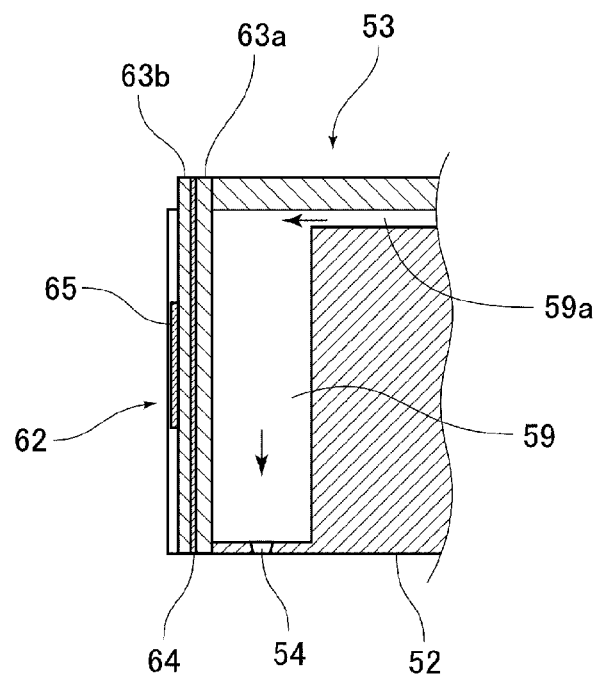
FIG. 8 is a cross-sectional view showing a deformation example of the structure in the vicinity of the column direction supply flow path, the nozzle pressurizing chamber and the column direction discharge flow path shown in FIG. 7.

In addition, in the structure shown in FIG. 7, the common electrode 64 is configured on the top surface of the nozzle pressurizing chamber 59, but it is not limited to this structure. For example, as shown in FIG. 8, a structure in which the common electrode 64 is configured on a side face of the nozzle pressurizing chamber 59 may also be used, and in addition, any structure may be used as long as the paint may be ejected from the nozzle 54 well.

(1-4. With Regard to a Control Structure of the Vehicle Painting Machine)

Next, a control mechanism of the vehicle painting machine 10 of the present embodiment will be described. The control mechanism is provided with an image processing portion 100, an arm control portion 110, a paint supply control portion 120, a head control portion 130, and a main control portion 140. In addition, the image processing portion 100, the arm control portion 110, the paint supply control portion 120, the head control portion 130 and the main control portion 140 are composed of a CPU, a memory (an ROM, an RAM, a non-volatile memory or the like), and other elements. In addition, the memory stores programs and data, which are used for executing desired control.

Among these, the image processing portion 100 forms a three-dimensional model (painting three-dimensional model) based on CAD data corresponding to a painting range of the vehicle. In addition, the image processing portion 100 forms, based on trajectory data D1 formed by the arm control portion 110 described later and the above painting three-dimensional model, two-dimensional divided painting data corresponding to the painting of the nozzle head 53 along the trajectory data D1.

In addition, the image processing portion 100 and the arm control portion 110 correspond to painting data forming means, but may also correspond to at least one painting data forming means that includes at least one excluding these portions (for example, the head control portion 130, the main control portion 140, and the like).

In addition, the arm control portion 110 is a portion that controls the driving of the above motors M1 to M6. The arm control portion 110 is provided with a memory 111, and the memory 111 stores the trajectory data D1 that is formed considering robot instruction of a painting width that the nozzle head 53 may paint, and posture data related to the posture of the nozzle head 53. Moreover, the arm control portion 110 controls the driving of the motors M1 to M6 based on the trajectory data D1 and the posture data stored in the memory 111 and the image processing in the image processing portion 100. By means of the control, the nozzle head 53 may pass through a desired position for performing painting at a desired speed, or stop at a predetermined position. In addition, the memory 111 may also be provided on the vehicle painting machine 10. However, the memory 111 may also exist outside the vehicle painting machine 10, and information may be received and sent relative to the memory 111 by means of a wired or wireless communication mechanism.

In addition, the paint supply control portion 120 is a portion that controls the supply of the paint to the nozzle head 53, and specifically controls the operation of a pump, a valve and the like included in the paint supply unit 40. At this time, preferably, the paint supply control portion 120 controls the operation of the above pump and the valve by supplying the paint at a constant pressure (one example of the constant pressure is a fixed amount) relative to the nozzle head 53.

In addition, the head control portion 130 is a portion that controls the operation of the piezoelectric substrate 62 in the nozzle head unit 50 based on the image processing in the image processing portion 100. When the head control portion 130 reaches a predetermined position of the trajectory data D1 according to a mechanism that detects the position of a sensor 150 or the like described later, it controls the ejection of the paint based on the divided painting data corresponding to the position. In addition, in this case, the driving frequency of the piezoelectric substrate 62 is controlled in a manner of ensuring a uniform film thickness of the vehicle, so as to control the number of points (the number of droplets) ejected from the nozzle 54, or the voltage applied to the piezoelectric substrate 62 is controlled to control the size of the droplets ejected from the nozzle 54.

In addition, the main control portion 140 is a portion that sends a predetermined control signal to the arm control portion 110, the paint supply control portion 120 and the head control portion 130 by performing painting relative to the painting object by means of the cooperation of the motors M1 to M6, the paint supply portion 40 and the piezoelectric substrate 62.

In addition, in order to keep the nozzle ejection surface 52 of the nozzle head 53 parallel to the painting surface under the control of the arm control portion 110, various sensors 150 are connected to the painting robot 20. Examples of the sensor 150 include an angular velocity sensor, an acceleration sensor, an image sensor, a ToF (Time of Flight) sensor or the like, but other sensors may also be used.

[2. With Regard to the Painting Method]

Figure 9:
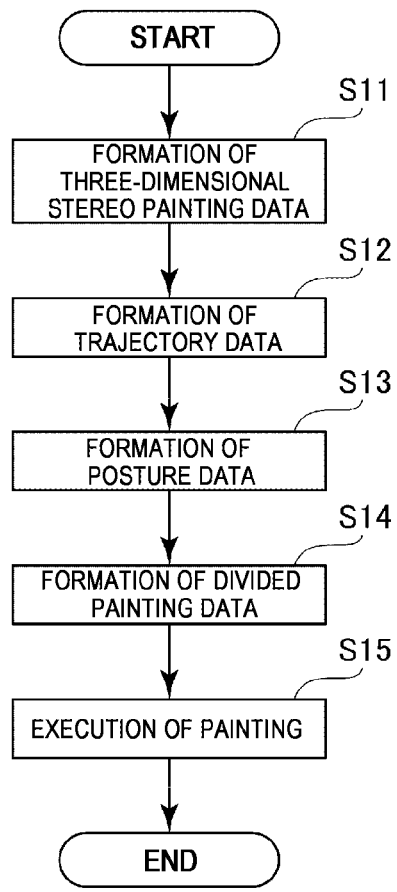
FIG. 9 is a flow diagram showing an outline of a painting method using the vehicle painting machine according to an embodiment of the present invention.

Next, based on FIG. 9, a painting method for painting painting objects such as vehicles and vehicle components in the vehicle painting machine 10 having the above-mentioned structure will be described. FIG. 9 is a flow diagram showing an outline of the painting method using the vehicle painting machine 10 of the present embodiment. First, the image processing portion 100 of the vehicle painting machine 10 forms a three-dimensional model (painting three-dimensional model) based on CAD data of the vehicle (step S11). In the painting three-dimensional model, a three-dimensional model of a location that is actually painted except for a location that is not to be painted is formed.

Next, the arm control portion 110 forms trajectory data D1 based on the above painting three-dimensional model (step S12). The trajectory data D1 may also be formed by considering robot instruction of a painting width that the nozzle head 53 may paint, or the trajectory data D1 is automatically generated. When such trajectory data D1 is formed, the trajectory data D1 is formed such that adjacent painting areas have a small overlapping portion L2, that is, a state in which the painting width L1 includes the overlapping portion L2. In addition, when the painting range in the vehicle is known in advance, the trajectory data D1 may also be formed without depending on the painting three-dimensional model, but, for example, depending on the CAD data.

In addition, step S12 may be performed first, and then step S11 may be performed. That is, after the trajectory data D1 is formed in the arm control portion 110, the painting three-dimensional model may be formed at a position lower than the trajectory data D1 by a predetermined distance.

Figure 10:
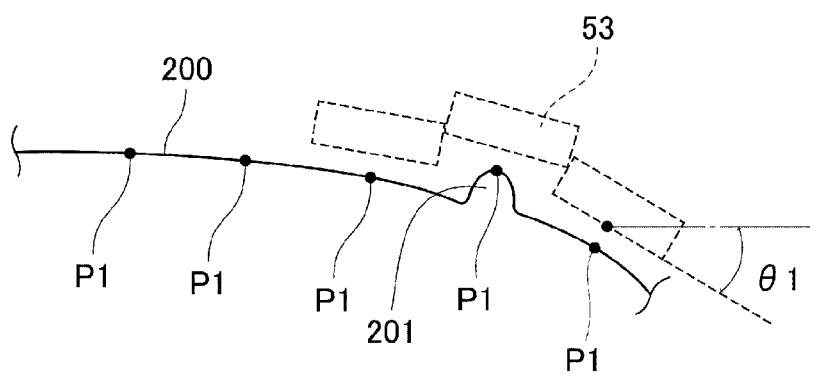
FIG. 10 is a diagram showing a height image when trajectory data is formed in the inkjet-type vehicle painting machine shown in FIG. 1.

Here, a height image when the trajectory data D1 is formed is as shown in FIG. 10. As shown in FIG. 10, there may be a height difference 201 in the vehicle 200 that serves as an actual painting target. Therefore, when the trajectory data D1 is formed, a location (the height difference 201 or the like) on a vehicle 200 side where the distance between the vehicle 200 side and the nozzle ejection surface 52 in the painting width L1 is the closest is taken as a reference location P1, and the trajectory data D1 is created at a position higher than the reference location P1 by a predetermined height, so as to prevent the interference between the height difference 201 and the nozzle head 53.

Figure 11:
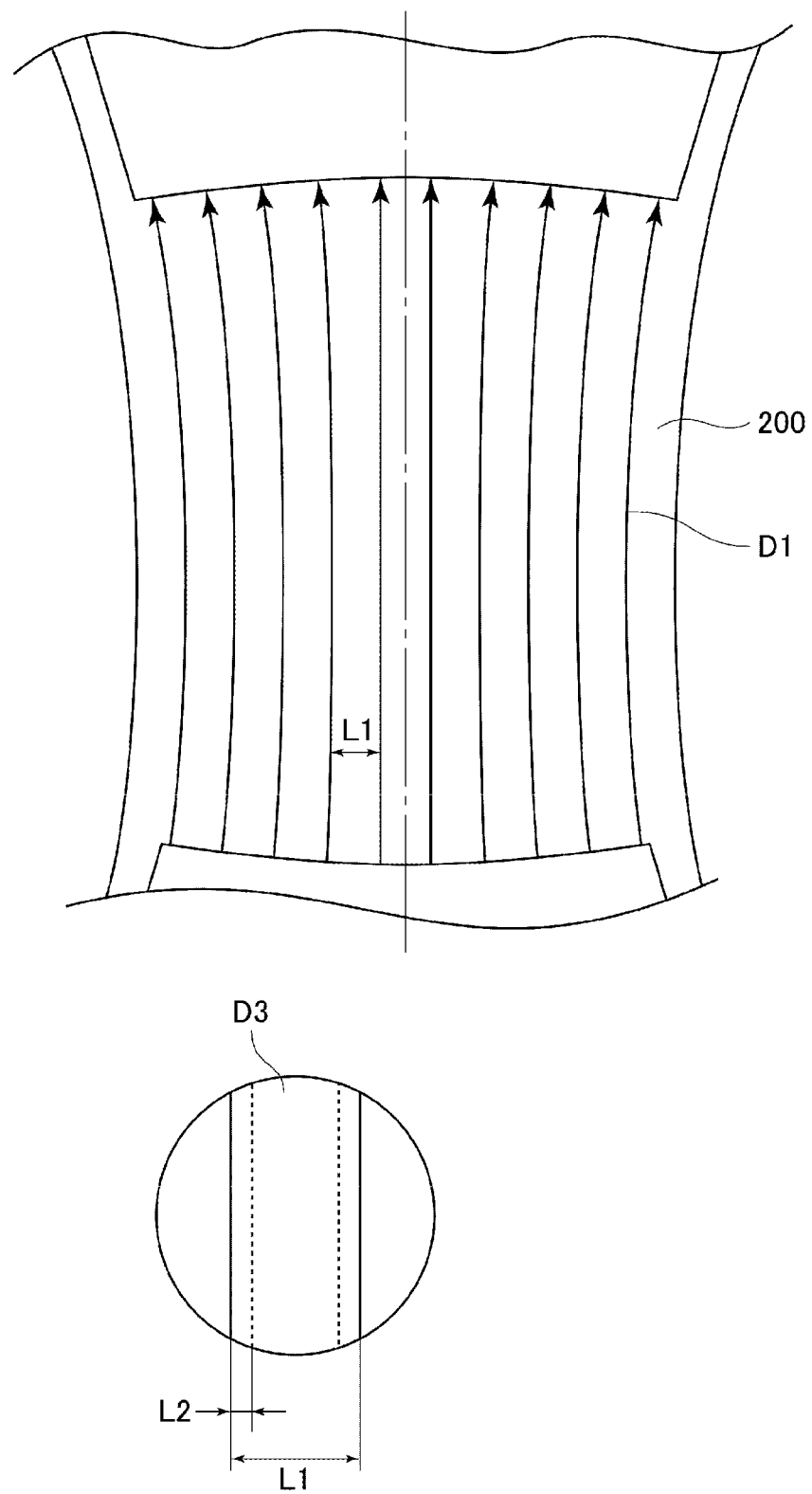
FIG. 11 is a diagram showing a state wherein the trajectory data is viewed from above relative to the vehicle in the inkjet-type vehicle painting machine shown in FIG. 1.

In addition, preferably, in the case of the overlooking trajectory data D1 as shown in FIG. 11, the trajectory data D1 is linear. However, the trajectory data D1 may also have a curved portion within a range in which the overlapping portion L2 of the divided painting data D3 described later is not lower than a lower limit.

Figure 12:
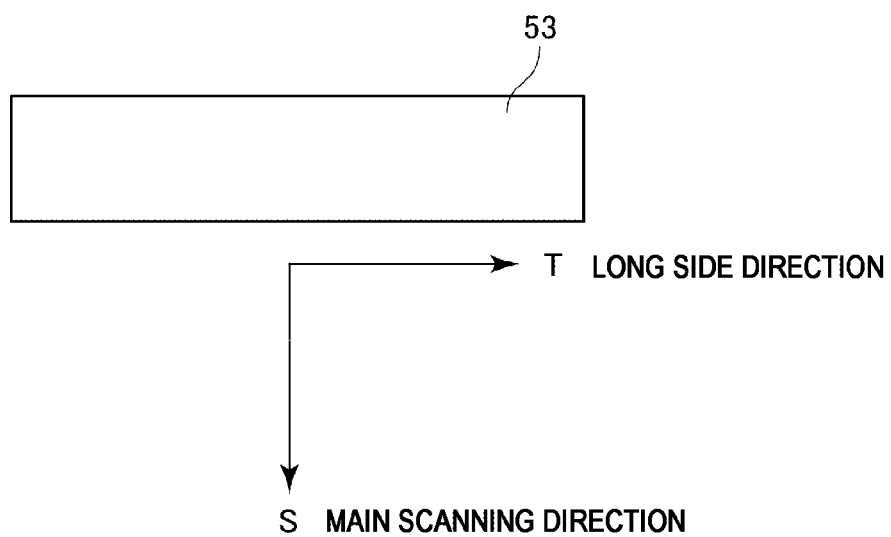
FIG. 12 is a diagram showing a state where a long side direction of the nozzle head is kept perpendicular relative to a main scanning direction of the nozzle head based on posture data in the inkjet-type vehicle painting machine shown in FIG. 1.

Next, the arm control portion 110 forms posture data in a manner corresponding to the trajectory data D1 (step 13). In addition, the posture data may also be formed together with the trajectory data D1. As shown in FIG. 12, the posture data is formed such that the long side direction (the lateral width direction) T of the nozzle head 53 is kept perpendicular relative to the main scanning direction S (the advancement direction) of the nozzle head 53. By forming such posture data, as shown in FIG. 4(B), it is possible to eject the paint on the painting surface at equal intervals.

Figure 13:
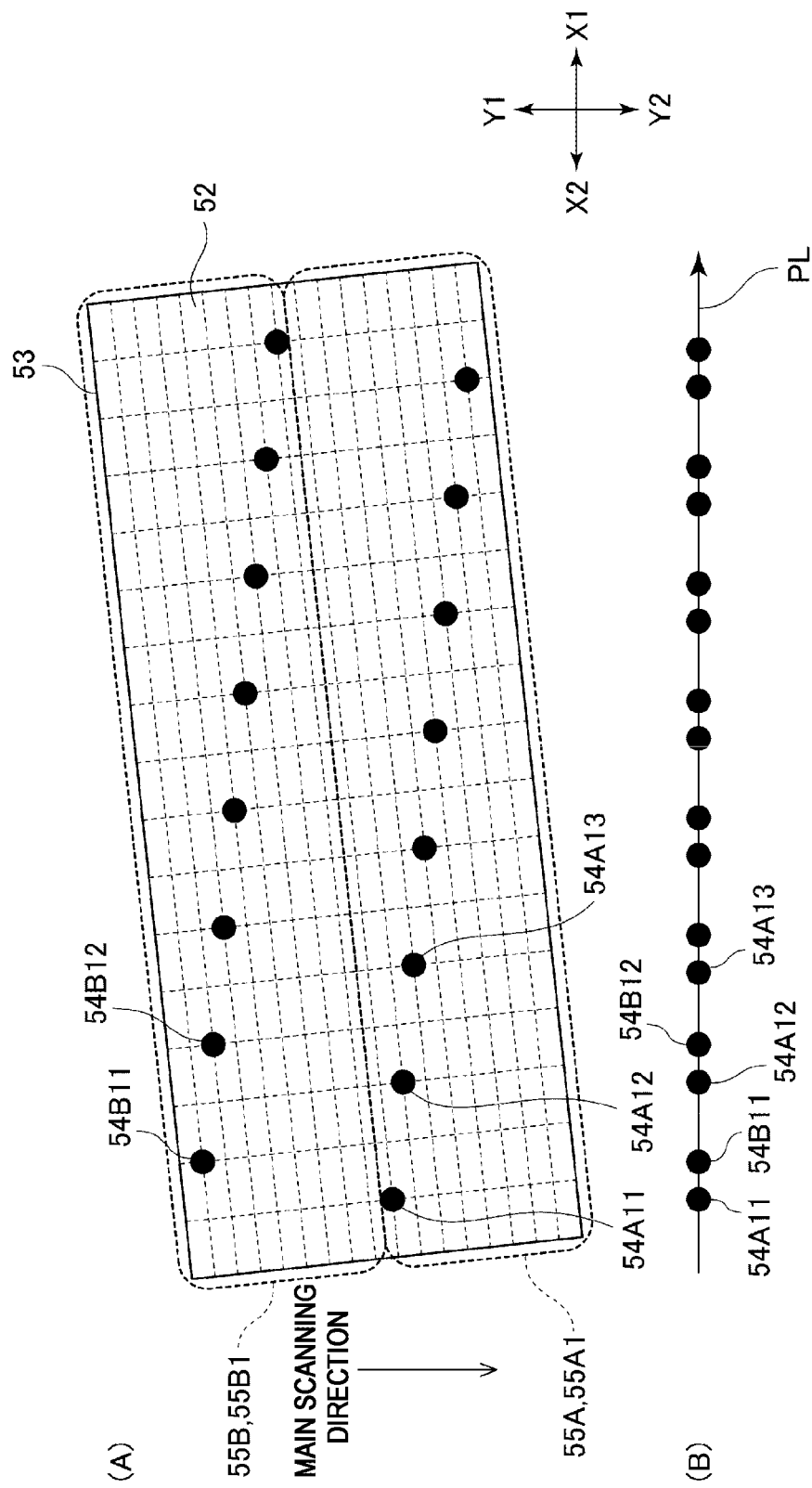
FIG. 13(A) is a diagram showing an image in which the long side direction of the nozzle head unit is not kept perpendicular but is inclined relative to FIG. 4(A)
FIG. 13(B) shows a result of ejecting paint from each nozzle when the nozzle head unit shown in FIG. 13(A) is inclined.

Here, FIG. 13 shows an image when the long side direction T of the nozzle head 53 is not kept perpendicular relative to the main scanning direction S of the nozzle head 53 (when the long side direction T is inclined relative to the main scanning direction S). As shown in FIG. 13, if the long side direction T of the nozzle head 53 is inclined, the landing positions of the droplets will be in a non-uniform state. That is, a portion where the droplets overlap each other and a portion where the droplets do not overlap and leave gaps are formed. Such overlaps and gaps of the droplets may cause poor painting. Therefore, the posture data is formed such that the long side direction T of the nozzle head 53 is kept perpendicular relative to the main scanning direction S of the nozzle head 53.

In addition, the posture data is formed so that in a section (cross section) in the width direction of the vehicle, at least a portion of the nozzle ejection surface 52 of the nozzle head 53 maintains a state of being parallel to the cross section of the vehicle that serves as the painting target. For example, as shown in FIG. 14, the posture data is formed, such that in the case where the portion of the painting width is inclined at a predetermined angle θ1 relative to the horizontal plane like the end side in the width direction of the vehicle, the nozzle head 53 is also inclined by the inclination amount.

Figure 14:
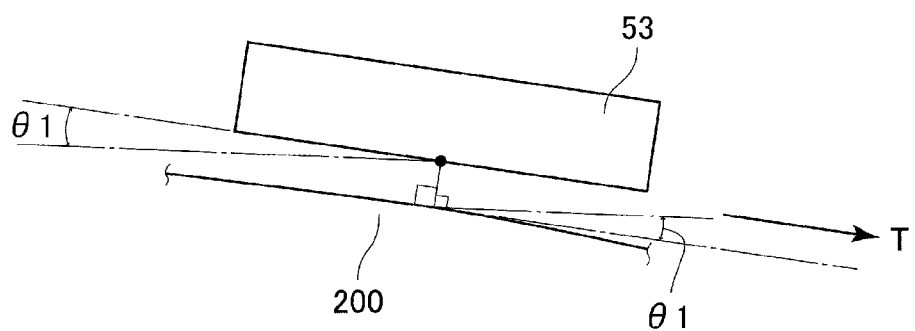
FIG. 14 is a diagram showing a state where the nozzle head is inclined at an angle corresponding to the angle of a location of a painting width based on the posture data in a cross section of the vehicle.

In addition, for the posture data, preferably, the posture data is formed such that, as shown in FIG. 14, for example, when the inclination angle of the painting surface at the location opposed to the center of the long side direction T of the nozzle ejection surface 52 is the angle θ1, the long side direction T of the nozzle head 53 is also inclined at the angle θ1. In this way, with the center of the nozzle ejection surface 52 in the long side direction T as a reference, the nozzle head 53 is inclined at the same angle as the inclination angle θ1 of the portion opposed to the center, so that the distance between any side of one end side or the other end side of the painting width of the nozzle ejection surface 52 and the painting surface is prevented from becoming larger. This is also because the distance between the center of the nozzle ejection surface 52 in the long side direction T and the painting surface opposed to the center is often the smallest, and the portion opposed to the center of the long side direction T becomes the reference location P1.

However, it is also possible to set the posture data in the following manner to incline the nozzle head 53, so that, for example, when the height difference 201 used as the reference location P1 is located close to one end side, the nozzle head 53 moves away from the other end side of the height difference and gradually approaches to the painting surface.

Figure 15:
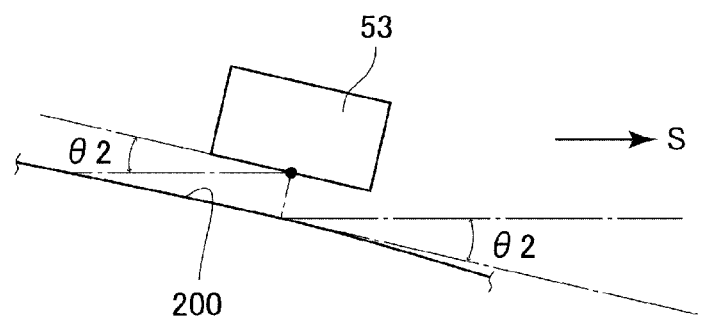
FIG. 15 is a diagram showing a state where the nozzle head is inclined at an angle corresponding to the inclination angle of a painting surface based on the posture data in a longitudinal section of the vehicle.

In addition, as shown in FIG. 15, like the both end sides of the nozzle head 53 in the main scanning direction S, in the section (longitudinal cross section) along the main scanning direction S, the painting surface may be inclined relative to the horizontal plane sometimes. In this case, preferably, the posture data is formed so that when the portion opposed to the center of the nozzle ejection surface 52 in a short side direction (longitudinal width direction; in this case, it is consistent with the main scanning direction S) is inclined at an angle θ2, the short side direction S of the nozzle head 53 is also inclined at the angle θ2. However, it is not necessary to form the posture data in such a way that the short side direction S is inclined at the angle θ2. At this time, in order to ensure the uniformity of the film thickness, the concentration of the image data may be increased in accordance with the size of the angle θ2.

Here, in order to simplify the posture control of the nozzle head 53, in the case where the nozzle head 53 is not inclined in the section along the main scanning direction S, the driving frequency H of the piezoelectric substrate 62 may also be changed to consistently maintain the painting film thickness. In this case, when the painting surface is horizontal, the driving frequency H of the piezoelectric substrate 62 is made to become 1/cos 0 times (in other words, greater than the frequency H). Thereby, the uniformity of the painting film thickness may be realized.

However, if the driving frequency H is made to become 1/cos 0 times as described above, and if facing to the large end portion side of the inclination angle θ2, the frequency of the painting head is increased. For example, if the inclination angle of the end portion is increased, for example, if the inclination angle is 45 degrees, the frequency H is made to become 1.4 times the frequency, and if the inclination angle is 60 degrees, the frequency H is doubled, and if the inclination angle is 70 degrees, the frequency H is made to become approximately three times the frequency. In this way, it is likely to reach an upper limit of the frequency. In order to cope with such a problem, for example, the arm control portion 110 may control the operation of the painting robot 20, so that when reaching areas (end portion areas) on both end sides in the main scanning direction S, the moving speed (scanning speed) of the nozzle head 53 is slower than that before arrival.

In addition, as another method of suppressing the increase in the frequency as described, an average inclination angle of the inclination angles θ2 of the areas (end portion areas) on the both end sides in the main scanning direction S may be specified, and the end portion areas may be approximated to planes for painting.

In addition, when a portion with a large curvature such as the end portion area cannot be approximated to a plane, the length of the curve in the end portion area of the cross section along the main scanning direction S may also be calculated by integration, and if it is calculated to be several times (assuming R times) greater than a straight line parallel to the horizontal plane, driving control is performed on the piezoelectric substrate 62 at a frequency that is R times the driving frequency H. In this way, the uniformity of the painting film thickness is achieved. However, in order to simplify the calculation, the magnification relative to the driving frequency H is converted by simple approximation such as circular approximation instead of being calculated by integration as described above.

After the trajectory data D1 and the posture data are formed as described above, the image processing portion 100 forms divided painting data actually corresponding to the painting width L1 of the nozzle head 53 based on the above-mentioned painting three-dimensional model, the trajectory data D1 and the posture data (step S14). In this case, the painting three-dimensional model is divided based on the trajectory data D1, but the divided painting data is formed to include the overlapping portion L2 that overlaps with the adjacent divided painting data.

Next, after the divided painting data is formed, painting is performed relative to the vehicle (step S15).

3. With Regard to the Effect

The inkjet-type vehicle painting machine 10 having the above-mentioned structure is provided with: a robot arm (rotating shaft portion 23 to wrist portion 27) capable of assembling a nozzle head 53 with a plurality of nozzles 54 to a front end portion and moving the assembled nozzle head 53; an arm control portion 110 for controlling the operation of the robot arm; a head control portion 130 for controlling the driving of the nozzle head 53; and painting data forming means (an image processing portion 100 and an arm control portion 110) for forming, based on a painting range corresponding to a vehicle to be painted, painting data that is used for controlling the driving of the nozzle head 53 by means of the head control portion 130.

Moreover, a plurality of nozzle columns 55 composed of nozzles 54 are arranged obliquely relative to a long side direction of the nozzle head 53, the nozzle column 55 is provided with a first nozzle column 55A that is located on one side in a scanning direction of the nozzle head 53, and a second nozzle column 55B that is located on the other side in the scanning direction, and the first nozzle column 55A and the second nozzle column 55B are configured in a state where the droplets ejected from the nozzles 55B in the second nozzle column 55B are ejected in the middle of the droplets ejected from adjacent nozzles 54 in the first nozzle column 55A when the long side direction of the nozzle head 53 is orthogonal to the scanning direction. Furthermore, the painting data forming means form trajectory data D1 for driving the robot arm to move the nozzle head 53, and forms, based on the trajectory data D1, posture data for keeping the long side direction of the nozzle head 53 perpendicular relative to a main scanning direction of the nozzle head 53. Furthermore, the arm control portion 110 controls the robot arm based on the trajectory data D1 and the posture data, so that the long side direction of the nozzle head 53 is kept perpendicular relative to the main scanning direction in a state where the nozzle head 53 moves along the main scanning direction and paint is ejected from the nozzle 54.

In this way, when the nozzle head 53 moves along the main scanning direction based on the trajectory data D1 and performs painting, the long side direction of the nozzle head 53 is controlled by the arm control portion 110 based on the posture data to kept perpendicular relative to the main scanning direction. As a result, as shown in FIG. 13(A), the nozzle head 53 can be prevented from tilting, and therefore, as shown in FIG. 13(B), the formation of a portion where the droplets overlap with each other and a portion where the droplets do not overlap and leave gaps is prevented. Therefore, the uniformity of the painting film thickness for the vehicle may be ensured, and the painting quality may be improved.

In addition, in the present embodiment, preferably, the painting data forming means (the image processing portion 100 and the arm control portion 110) take a location on a vehicle 200 side where the distance between the vehicle and a nozzle ejection surface 52 in the painting width of the nozzle head 53 is the closest as a reference location P1, and create the trajectory data D1 at higher than the reference location P1 by a position a predetermined height.

In the case of such a configuration, it is possible to prevent the nozzle head 53 (the nozzle ejection surface 52) from interfering with a protruding location such as the height difference 201. Therefore, it is possible to prevent the occurrence of poor painting due to a damage to the painting location by the nozzle head 53 (the nozzle ejection surface 52).

In addition, in the present embodiment, preferably, the painting data forming means (the image processing portion 100 and the arm control portion 110) form, before forming the trajectory data D1, a painting three-dimensional model for the painting range per painting range of the vehicle to be painted, and form divided painting data actually corresponding to the painting width of the nozzle head 53 based on the painting three-dimensional model, the trajectory data D1 and the posture data, and the divided painting data includes an overlapping portion L2 that overlaps with adjacent divided painting data.

In the case of such a configuration, since the divided painting data that is formed based on the painting three-dimensional model, the trajectory data D1 and the posture data includes the overlapping portion L2, it is possible to prevent the formation of a gap between the painting by scanning of a certain nozzle head 53 and the painting by scanning of a certain subsequent nozzle head 53. In addition, by having the overlapping portion L2 as described above, within a range not lower than a lower limit of the overlapping portion L2, not only linear trajectory data D1, but also curved trajectory data D1 may be formed.

In addition, in the present embodiment, preferably, the painting data forming means (the image processing portion 100 and the arm control portion 110) form the posture data, so that in a width direction of the vehicle, the nozzle head 53 is inclined at an inclination angle $\theta1$ the same as the inclination angle $\theta1$ of the painting location of the vehicle, which is located at a location opposed to the center of the nozzle head 53 in the long side direction.

In the case of such a configuration, as shown in FIG. 14, in the width direction of the vehicle, the center of the nozzle head 53 can be in a state perpendicular to the painting location. Therefore, the both end sides of the nozzle head 53 in the long side direction are close to the painting location. Thereby, the paint may be made to fall on a desired position, and the painting quality may be improved. In addition, since the nozzle head 53 may be close to the painting location, it is possible to reduce the paint that scatters excessively, and thus the waste of the paint may be reduced.

In addition, in the present embodiment, preferably, the painting data forming means (the image processing portion 100 and the arm control portion 110) form the posture data, so that in the long side direction of the vehicle, the nozzle head 53 is inclined at an inclination angle $\theta2$ the same as the inclination angle $\theta2$ of the painting location of the vehicle, which is located at a location opposed to the center of the nozzle head 53 in a short side direction.

In the case of such a configuration, as shown in FIG. 15, in the long side direction of the vehicle, the center of the nozzle head 53 can be in a state perpendicular to the painting location. Therefore, the both end sides of the nozzle head 53 in the short side direction are close to the painting location. Thereby, the paint may be made to fall on a desired position, and the painting quality may be improved. In addition, since the nozzle head 53 may be close to the painting location, it is possible to reduce the paint that scatters excessively, and thus the waste of the paint may be reduced.

In addition, in the present embodiment, preferably, the painting data forming means (the image processing portion 100 and the arm control portion 110) increase the concentration of the divided painting data according to the inclination angle of the location opposed to the center of the nozzle head 53 in the short side direction.

In the case of such a configuration, even for a location inclined relative to the horizontal plane, such as the end portion in the long side direction of the vehicle, the concentration of the divided painting data may be increased to form the same painting painting thickness as other locations. Thereby, the entire painting range of the vehicle may have a uniform painting film thickness.

4. With Regard to a Deformation Example

One embodiment of the present invention has been described above, but the present invention may have various deformations in addition to the above-mentioned embodiment. Hereinafter, a deformation example will be described.

In the above-mentioned embodiment, before the divided painting data is formed, the trajectory data D1 is formed. However, it is also possible to form the divided painting data by means of the image processing portion 100 before the trajectory data D1 is formed.

That is, the painting data forming means (the image processing portion 100 and the arm control portion 110) form, before forming the trajectory data D1, a painting three-dimensional model for the painting range per painting range of the vehicle to be painted. The painting data forming means form two-dimensional painting data for painting the vehicle based on the painting three-dimensional model. The painting data forming means form divided painting data actually corresponding to the painting width of the nozzle head based on the two-dimensional painting data. The painting data forming means form the trajectory data D1 based on the divided painting data.

Figure 16:
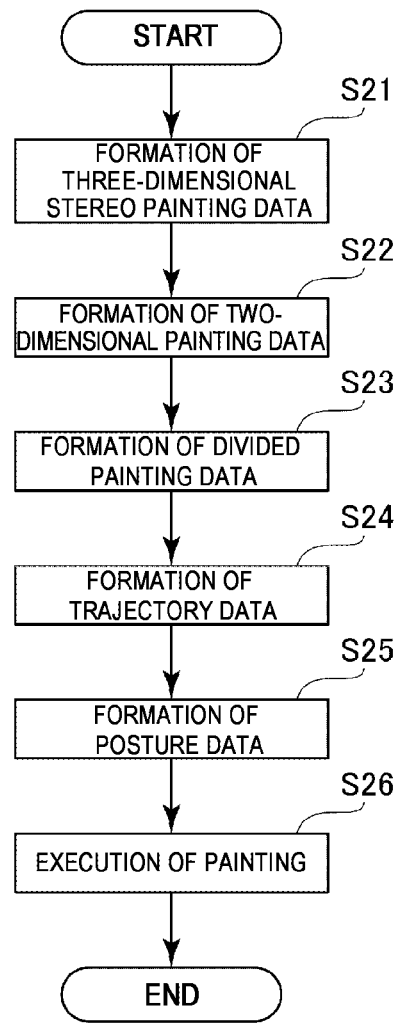
FIG. 16 is a flow chart showing an outline of a painting method using the vehicle painting machine according to a deformation example of the present invention.

In this case, as shown in FIG. 16, first, a three-dimensional model (painting three-dimensional model) is formed in the image processing portion 100 (step S21). Next, based on the painting three-dimensional model, planar two-dimensional painting data is formed in the image processing portion 100 (step S22). Then, the two-dimensional painting data is divided by a painting width L1 that the nozzle head 53 may paint, so as to form divided painting data (step S23), wherein the painting width L1 further has the overlapping portion L2. After that, the arm control portion 110 forms trajectory data D1 for scanning by the nozzle head 53 above the divided painting data (step S24). Moreover, posture data is formed in a manner corresponding to the trajectory data D1 in the arm control portion 110 (step S25).

As described above, after the divided painting data, the trajectory data D1 and the posture data are formed, painting is performed relative to the vehicle (step S26). In this way, the painting may also be performed on the vehicle well.

DESCRIPTION OF REFERENCE SIGNS

10 . . . vehicle painting machine; 20 . . . painting robot; 21 . . . base; 22 . . . leg portion; 23 . . . rotating shaft portion; 24 . . . rotating arm; 25 . . . first rotating arm; 26 . . . second rotating arm; 27 . . . wrist portion; 30 . . . chuck portion; 40 . . . paint supply portion; 50 . . . nozzle head unit; 52 . . . nozzle ejection surface; 53 . . . nozzle head; 53B . . . nozzle; 54 . . . nozzle; 54A . . . nozzle; 54A11 . . . nozzle; 54A12 . . . nozzle; 54A13 . . . nozzle; 54B . . . nozzle; 54B11 . . . nozzle; 54B12 . . . nozzle; 55 . . . nozzle column; 55A . . . first nozzle column; 55A1 . . . first nozzle column; 55B . . . second nozzle column; 55B1 . . . second nozzle column; 57 . . . supply side large flow path; 58 . . . column direction supply flow path; 59 . . . nozzle pressurizing chamber; 59a . . . nozzle supply flow path; 59b . . . nozzle ejection flow path; 60 . . . column direction discharge flow path; 61 . . . discharge side large flow path; 62 . . . piezoelectric substrate; 63a . . . piezoelectric ceramic layer; 63b . . . piezoelectric ceramic layer; 64 . . . common electrode; 65 . . . individual electrode; 71 . . . supply path; 72 . . . return path; 81 . . . memory; 100 . . . image processing portion (corresponding to a portion of painting data forming means); 110 . . . arm control portion (corresponding to a portion of the painting data forming means); 111 . . . memory; 120 . . . paint supply control portion; 130 . . . head control portion; 140 . . . main control portion; 150 . . . sensor; 200 . . . vehicle; 210 . . . height difference; D1 . . . trajectory data; D3 . . . divided painting data; L1 . . . painting width; L2 . . . portion; M1 . . . motor; M2 . . . motor; M3 . . . motor; M4 . . . motor; M5 . . . motor; M6 . . . motor; P1 . . . reference location; PL . . . projection straight line; S . . . main scanning direction (short side direction); T . . . long side direction.

What is claimed is:

1. An inkjet-type vehicle painting machine for performing painting by ejecting paint from nozzles onto a vehicle located on a painting line, the inkjet-type vehicle painting machine comprising:
    a nozzle head having a plurality of the nozzles;
    a robot arm capable of assembling the nozzle head to a front end portion and moving the assembled nozzle head;
    an arm control portion for controlling the operation of the robot arm;
    a head control portion for controlling a driving of the nozzle head; and
    painting data forming means for forming, based on a painting range corresponding to a vehicle to be painted, painting data that is used for controlling a driving of the nozzle head by means of the head control portion,
    a plurality of nozzle columns composed of the nozzles being arranged obliquely relative to a long side direction of the nozzle head,
    the nozzle columns being provided with a first nozzle column that is located on one side in a scanning direction of the nozzle head and a second nozzle column that is located on the other side in the scanning direction,
    the first nozzle column and the second nozzle column being configured in a state where the droplets ejected from the nozzles in the second nozzle column are ejected in the middle of the droplets ejected from adjacent nozzles in the first nozzle column when the long side direction of the nozzle head is orthogonal to the scanning direction, the painting data forming means:
forming trajectory data for driving the robot arm to move the nozzle head, and forming, based on the trajectory data, posture data for keeping the long side direction of the nozzle head perpendicular relative to a main scanning direction of the nozzle head, and the arm control portion controlling the robot arm based on the trajectory data and the posture data, so that the long side direction of the nozzle head is kept perpendicular relative to the main scanning direction in a state where the nozzle head moves along the main scanning direction and the paint is ejected from the nozzles.

2. The inkjet-type vehicle painting machine of claim 1, wherein the painting data forming means take a location on a vehicle side where the distance between the vehicle and a nozzle ejection surface in the painting width of the nozzle head is the closest as a reference location, and create the trajectory data at a position higher than the reference location by a predetermined height.

3. The inkjet-type vehicle painting machine of claim 2, wherein the painting data forming means:
form, before forming the trajectory data, a painting three-dimensional model for the painting range per painting range of the vehicle to be painted, and form divided painting data actually corresponding to the painting width of the nozzle head based on the painting three-dimensional model, the trajectory data and the posture data, and the divided painting data comprises an overlapping portion that overlaps with the adjacent divided painting data.

4. The inkjet-type vehicle painting machine of claim 3, wherein the painting data forming means form the posture data, so that in a width direction of the vehicle, the nozzle head is inclined at an inclination angle the same as an inclination angle of the painting location of the vehicle, which is located at a location opposed to the center of the nozzle head in the long side direction.

5. The inkjet-type vehicle painting machine of claim 1, wherein the painting data forming means:
form, before forming the trajectory data, a painting three-dimensional model for the painting range per painting range of the vehicle to be painted, and form divided painting data actually corresponding to the painting width of the nozzle head based on the painting three-dimensional model, the trajectory data and the posture data, and the divided painting data comprises an overlapping portion that overlaps with the adjacent divided painting data.

6. The inkjet-type vehicle painting machine of claim 5, wherein the painting data forming means form the posture data, so that in a width direction of the vehicle, the nozzle head is inclined at an inclination angle the same as an inclination angle of the painting location of the vehicle, which is located at a location opposed to the center of the nozzle head in the long side direction.

7. The inkjet-type vehicle painting machine of claim 6, wherein the painting data forming means form the posture data, so that in a long side direction of the vehicle, the nozzle head is inclined at an inclination angle the same as an inclination angle of the painting location of the vehicle, which is located at a location opposed to the center of the nozzle head in a short side direction.

8. The inkjet-type vehicle painting machine of claim 7, wherein the painting data forming means increase a concentration of the divided painting data according to the inclination angle of the location opposed to the center of the nozzle head in the short side direction.

9. The inkjet-type vehicle painting machine of claim 5, wherein the painting data forming means form the posture data, so that in a long side direction of the vehicle, the nozzle head is inclined at an inclination angle the same as an inclination angle of the painting location of the vehicle, which is located at a location opposed to the center of the nozzle head in a short side direction.

10. The inkjet-type vehicle painting machine of claim 9, wherein the painting data forming means increase a concentration of the divided painting data according to the inclination angle of the location opposed to the center of the nozzle head in the short side direction.

11. The inkjet-type vehicle painting machine of claim 1, wherein,
the painting data forming means:
form, before forming the trajectory data, a painting three-dimensional model for the painting range per painting range of the vehicle to be painted, form two-dimensional painting data for painting the vehicle based on the painting three-dimensional model, form divided painting data actually corresponding to the painting width of the nozzle head based on the two-dimensional painting data, and form the trajectory data based on the divided painting data.

12. An inkjet-type vehicle painting method of performing painting by ejecting paint from nozzles onto a vehicle located on a painting line, the inkjet-type vehicle painting method comprising:
a nozzle head having a plurality of nozzle columns composed of nozzles, wherein the nozzle column is arranged obliquely relative to a long side direction of the nozzle head, the nozzle column being provided with a first nozzle column that is located on one side in a scanning direction of the nozzle head, and a second nozzle column that is located on the other side in the scanning direction, the first nozzle column and the second nozzle column being configured in a state where the droplets ejected from the nozzles in the second nozzle column are ejected in the middle of the droplets ejected from adjacent nozzles in the first nozzle column when the long side direction of the nozzle head is orthogonal to the scanning direction, forming trajectory data for driving a robot arm to move the nozzle head, the robot arm assembling the nozzle head at a front end portion, forming, based on the trajectory data, posture data for keeping the long side direction of the nozzle head perpendicular relative to a main scanning direction of the nozzle head; and controlling the robot arm based on the trajectory data and the posture data, so that the long side direction of the nozzle head is kept perpendicular relative to the main scanning direction in a state where the nozzle head moves along the main scanning direction and the paint is ejected from the nozzles.

\* \* \* \* \*